US006386899B1

(12) United States Patent
Ushio et al.

(10) Patent No.: US 6,386,899 B1
(45) Date of Patent: May 14, 2002

(54) RECEPTACLE TYPE CONNECTOR

(75) Inventors: Kohei Ushio; Yutaka Ushiro, both of Osaka (JP)

(73) Assignee: J. S. T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/829,934

(22) Filed: Apr. 11, 2001

(30) Foreign Application Priority Data

Apr. 13, 2000 (JP) ...................................... 2000-112320

(51) Int. Cl.[7] ................................................ A01R 13/64
(52) U.S. Cl. ........................ 439/374; 222/168.5; 399/35
(58) Field of Search ................................. 439/374, 910, 439/205, 206; 399/31, 35, 106; 222/168.5

(56) References Cited

U.S. PATENT DOCUMENTS 3,560,632 A * 2/1971 Wallace ...................... 439/910
5,967,817 A * 10/1999 Greenstein .................. 439/205

* cited by examiner

*Primary Examiner*—Renee Luebke
*Assistant Examiner*—Briggitte Hammond
(74) *Attorney, Agent, or Firm*—Oblon, Spivak, McClelland, Maier & Neustadt, P.C.

(57) ABSTRACT

A receptacle type connector fixed to a side plate of an image forming device body includes a primary inserting and drawing recess which is open upward. A contact holding wall of an opponent plug type connector is inserted into and drawn out from the primary inserting and drawing recess. Even when toner intrudes into the primary inserting and drawing recess which is open, the toner can be discharged from the connector via the through-hole, which is formed in a lower portion of the primary inserting and drawing recess, by lightly tapping the receptacle type connector.

8 Claims, 5 Drawing Sheets

RECEPTACLE TYPE CONNECTOR

BACKGROUND OF THE INVENTION

1. Field of the Invention

The present invention relates to a receptacle type connector which is one of a pair of connectors to connect electronic parts. For example, the present invention relates to a receptacle type connector which is one of a pair of connectors to attach a toner cartridge of an image forming device of a copier, facsimile terminal equipment or printer to a device body or detach the toner cartridge of an image forming device of a copier, facsimile terminal equipment or printer from the device body.

2. Description of the Related Art

For example, when a toner cartridge is attached to or detached from an image forming device body, connectors for supplying electric power or transmitting signals are simultaneously connected together with the toner cartridge. Conventionally, the toner cartridge is inserted into and drawn out from the image forming device body in the lateral direction. Therefore, it is common that the inserting and drawing direction of the toner cartridge coincides with the inserting and drawing direction of the connectors.

On the other hand, from the viewpoint of improving the layout of parts arranged in an image forming device, it is desirable that both connectors are inserted into and drawn out from each other when the toner cartridge is moved upward and downward in the image forming device. In this case, the plug type connector is arranged on a side plate of the toner cartridge and the receptacle type connector is arranged in an image forming device body.

The inserting and drawing recess of the receptacle type connector in the image forming device body for inserting and drawing the inserting protrusion to hold the contacts of the plug type connector is open upward when the toner cartridge is removed.

In this connection, when a used toner cartridge is replaced with a new one in some cases, toner is scattered in the image forming device through a toner falling hole formed in the toner cartridge. The thus scattered toner intrudes into the inserting and drawing recess of the receptacle type connector which is open upward as described above. When the thus scattered toner tends to intrude into the inserting and drawing recess of the receptacle type connector in this way, it is impossible to successfully connect both the connectors. Therefore, the connectors can not be electrically connected with each other. According to the environment in which the image forming device body is used, dust might intrude into the inserting and drawing recess of the receptacle type connector and the same problems might be caused.

SUMMARY OF THE INVENTION

The present invention has been accomplished to solve the above problems. It is an object of the present invention to provide a receptacle type connector, the function of which is not impaired even when toner is scattered or dust intrudes into the device.

In order to accomplish the above object, the invention described as a first aspect provides a receptacle type connector attached to and detached from a plug type connector when a maintenance part is attached to and detached from an image forming device, including a housing having an inserting and drawing recess, which is open upward, into which a contact holding wall of the plug type connector is inserted and from which the contact holding wall of the plug type connector is drawn out, wherein the housing has a through-hole opening a lower portion of the inserting and drawing recess to the outside.

According to this structure, for example, in the case of replacing a toner cartridge, even if toner is scattered and intrudes into the inserting and drawing recess which is open in the process of replacing the toner cartridge, it is possible to easily discharge the toner, which has gotten into the inserting and drawing recess, downward via the through-hole when vibration is given to the receptacle type connector by lightly tapping it. Accordingly, there is no possibility that the scattered toner impairs the connection of the connectors or the electrical connection between the contacts.

The invention described as a second aspect provides a receptacle type connector according to the first aspect, wherein four wall sections to define a periphery of the inserting and drawing recess include a first wall section for holding contacts coming into contact with contacts of the plug type connector and a second wall section opposing to the first wall section, and the through-hole is provided in the second wall section. If a through-hole is formed in the first wall section for holding the contacts, the intruding toner tends to come into contact with the contacts until it reaches the through-hole. On the other hand, according to this structure, it is possible to discharge the intruding toner without making it come into contact with the contacts. Therefore, this structure is preferable.

The present invention described as a third aspect provides a receptacle type connector according to the second aspect, wherein the housing includes a subsidiary inserting and drawing recess adjacent to the first wall section so as to insert and draw a guide wall of the plug type connector and also includes a through-hole opening a lower portion of the subsidiary inserting and drawing recess to the outside.

When the guide wall of the plug type connector is engaged with the subsidiary inserting and drawing recess of the receptacle type connector, both the connectors can be strongly connected with each other in a connecting state of a so-called ship-lap or rabbet joint. Since the connecting condition of both the connectors is so good that it is impossible for toner to intrude inside the connectors. On the contrary, when both the connectors are disconnected from each other, the subsidiary inserting and drawing recess are open upward. When scattered toner intrudes into this open portion of the recess, the connection of both the connectors is obstructed. In order to solve the above problems, in the structure of the present invention, a through-hole is formed in the subsidiary inserting and drawing recess of the guide wall so that the toner intruding into this recess can be discharged.

The invention described as a fourth aspect provides a receptacle type connector according to the first to third aspects, wherein an exit section of the through-hole is arranged at a position except for an engaging portion of the receptacle type connector with the plug type connector forming a pair together with the receptacle type connector. In this structure, even in the connecting condition of both the connectors, the exit of the through-hole is open. Accordingly, even if the intruding toner remains in the inserting and drawing recess, since vibration is transmitted from the drive system to the inserting and drawing recess when the image forming device is operated, the discharge of toner from the through-hole can be facilitated.

DETAILED DESCRIPTION OF THE PREFERRED EMBODIMENTS

Referring to the appended drawings, a preferred embodiment of the present invention will be explained below.

Figure 1:
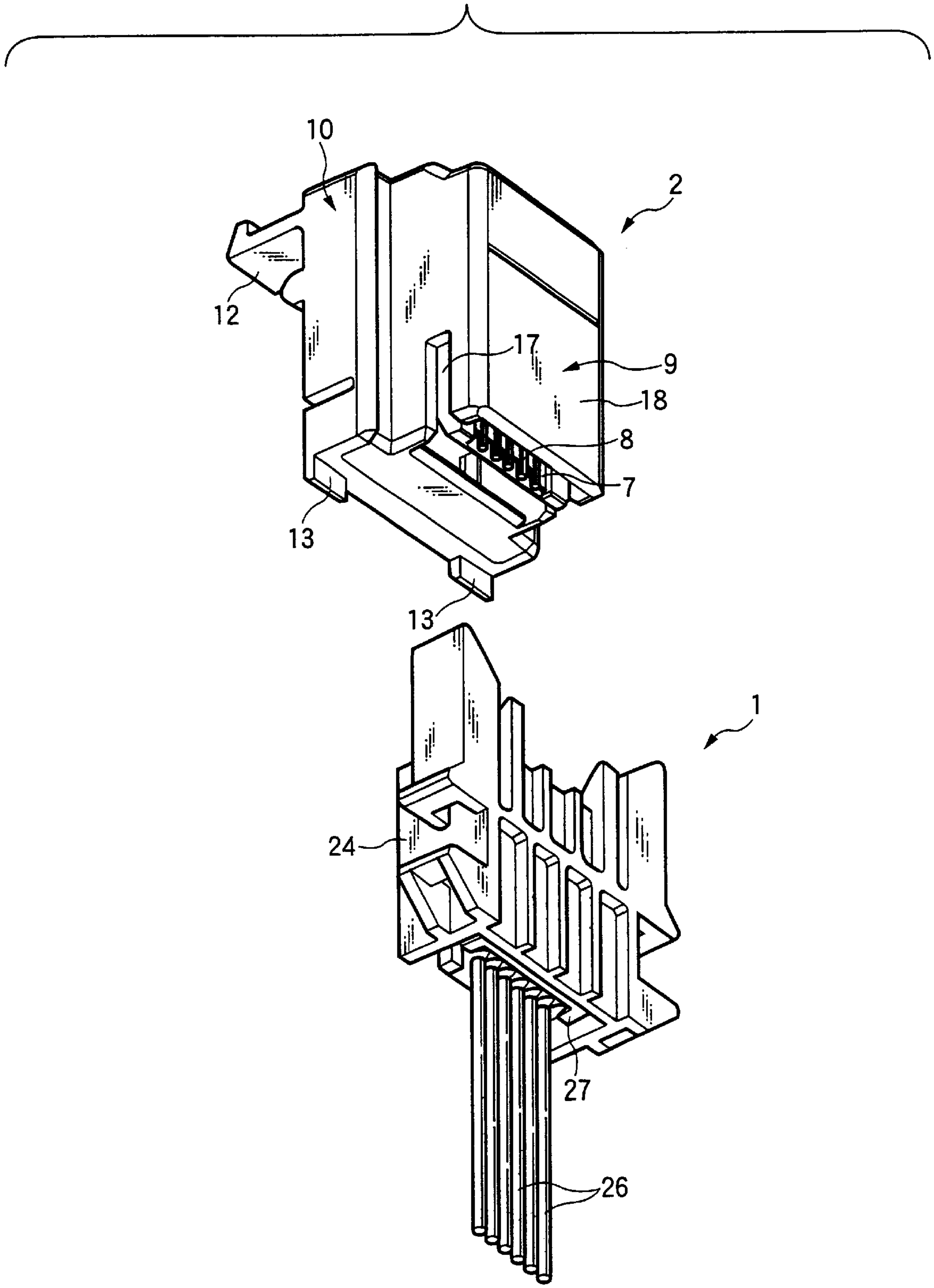
FIG. 1 is an exploded perspective view of a receptacle type connector of an embodiment of the present invention and a plug type connector which forms a pair together with the receptacle type connector.
Figure 2:
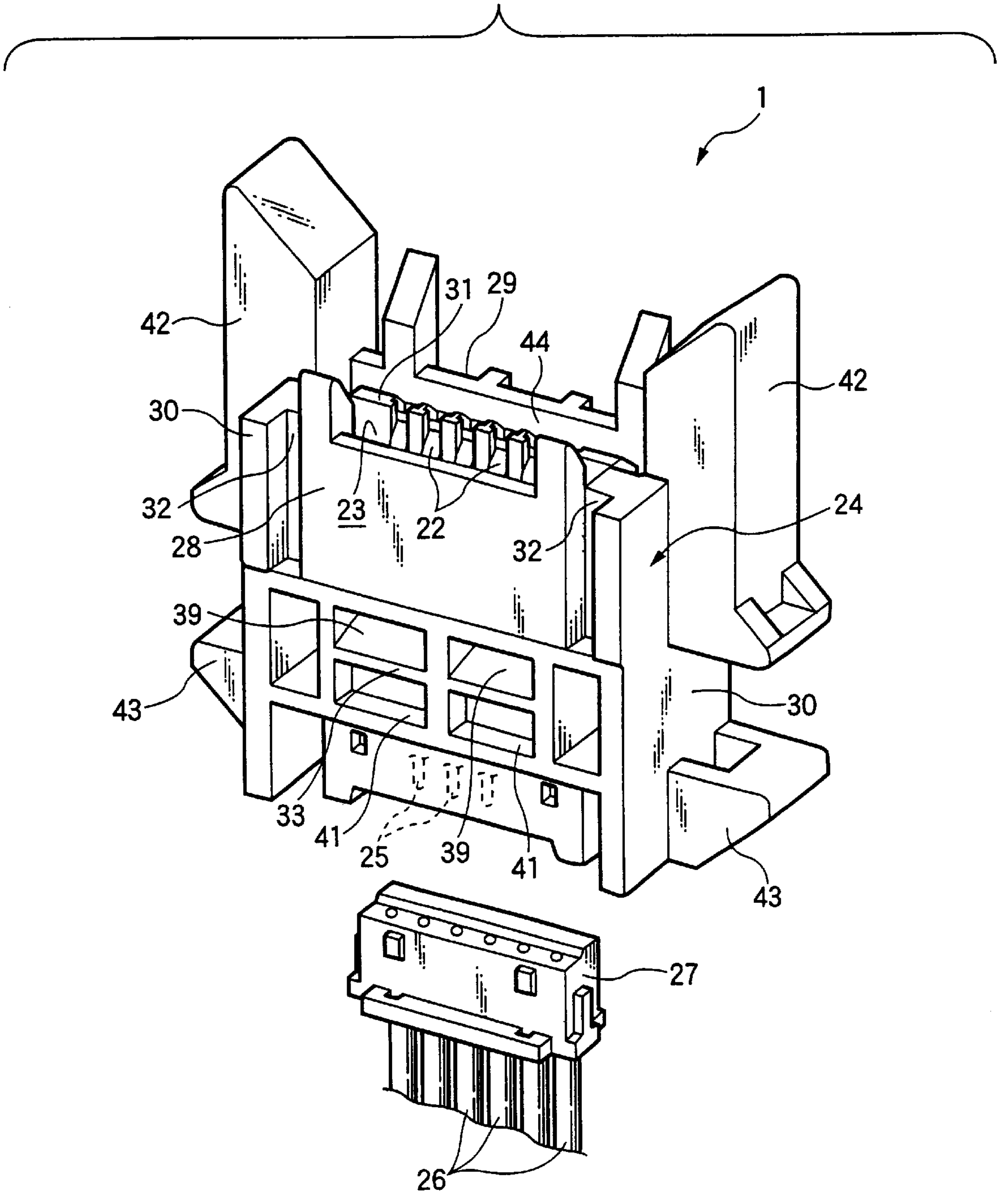
FIG. 2 is an exploded perspective view of the receptacle type connector which is viewed from the back face side.
Figure 3:
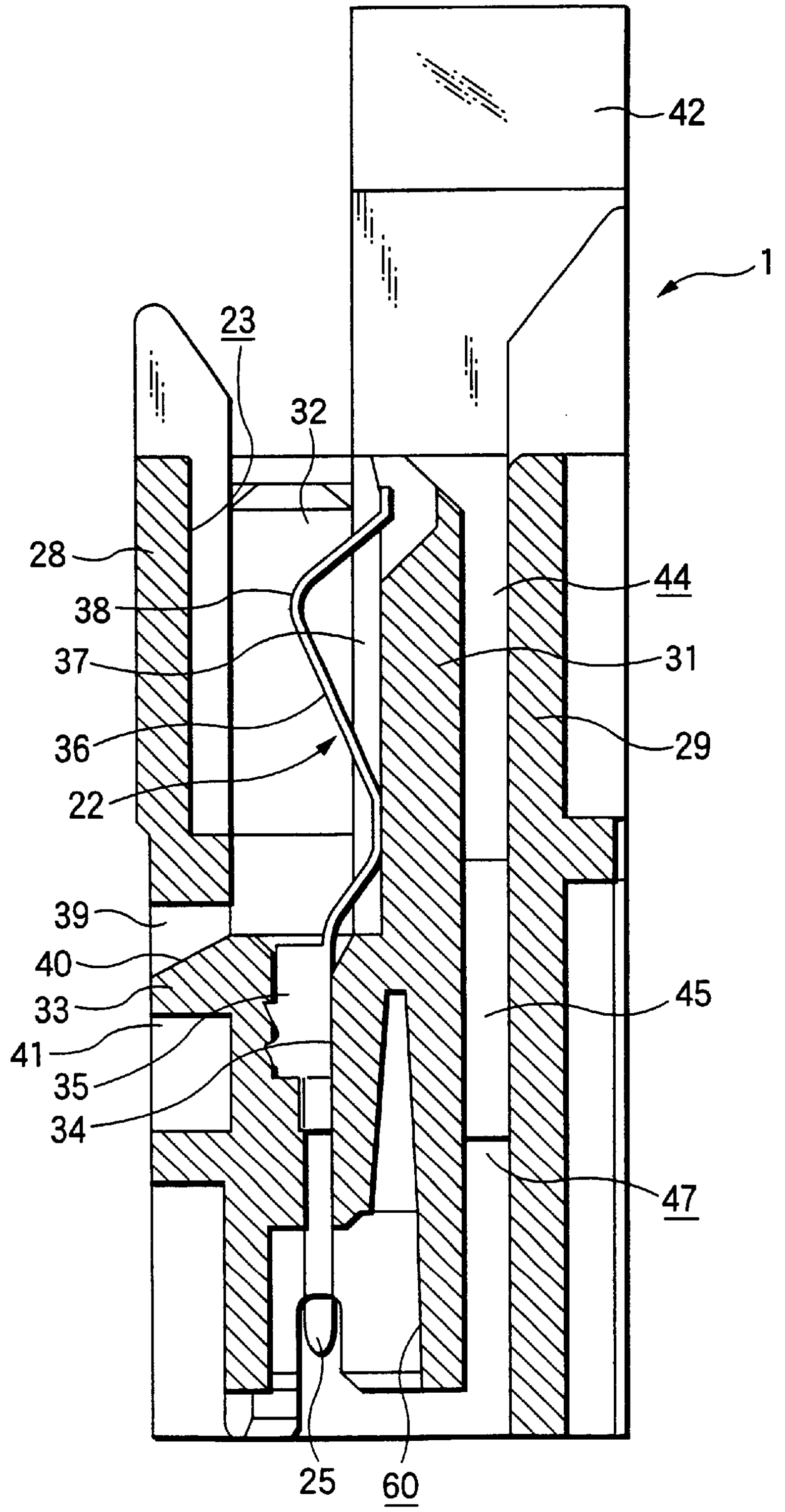
FIG. 3 is a longitudinal cross-sectional view of the receptacle type connector.
Figure 4:
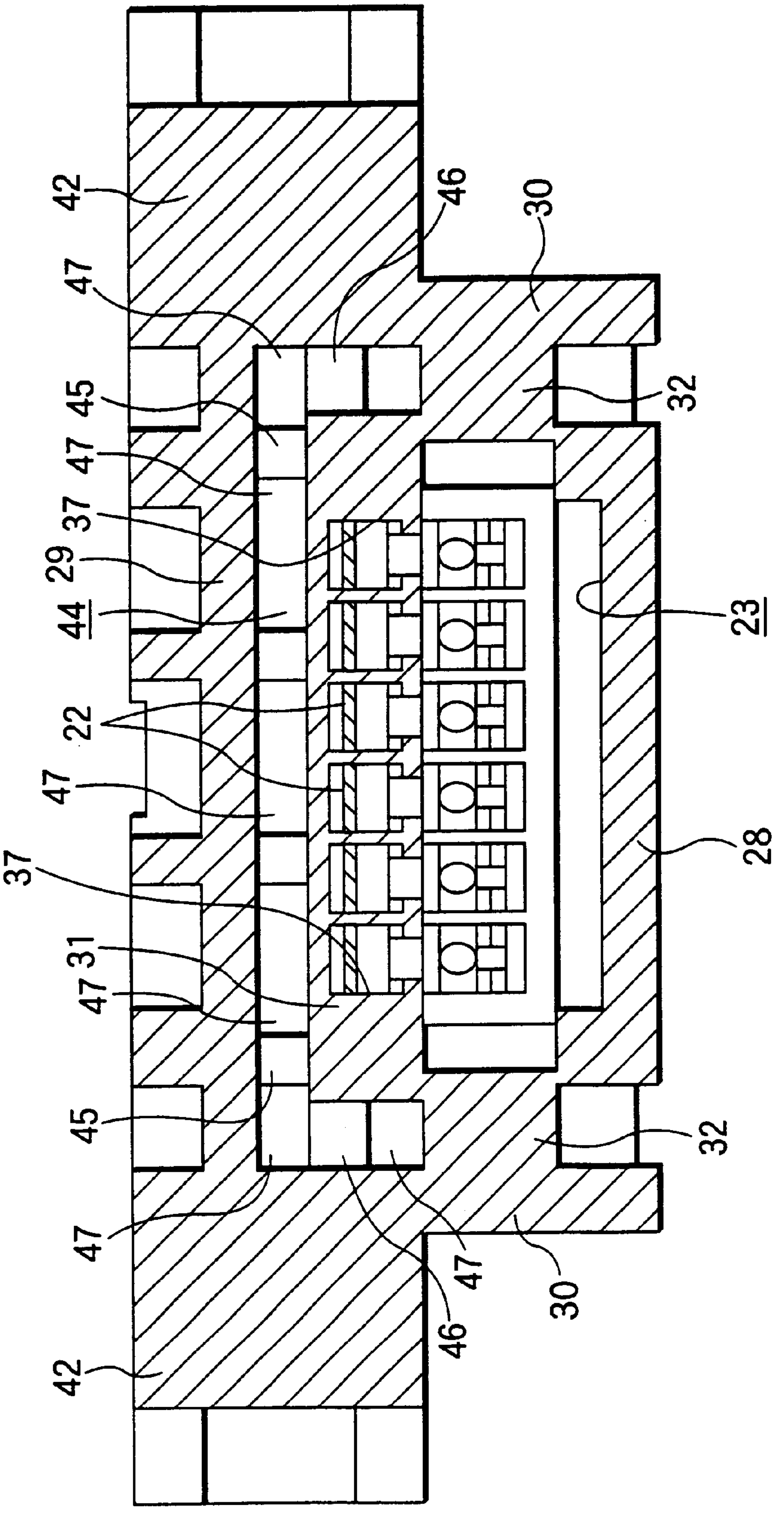
FIG. 4 is a lateral cross-sectional view of the receptacle type connector.
Figure 5:
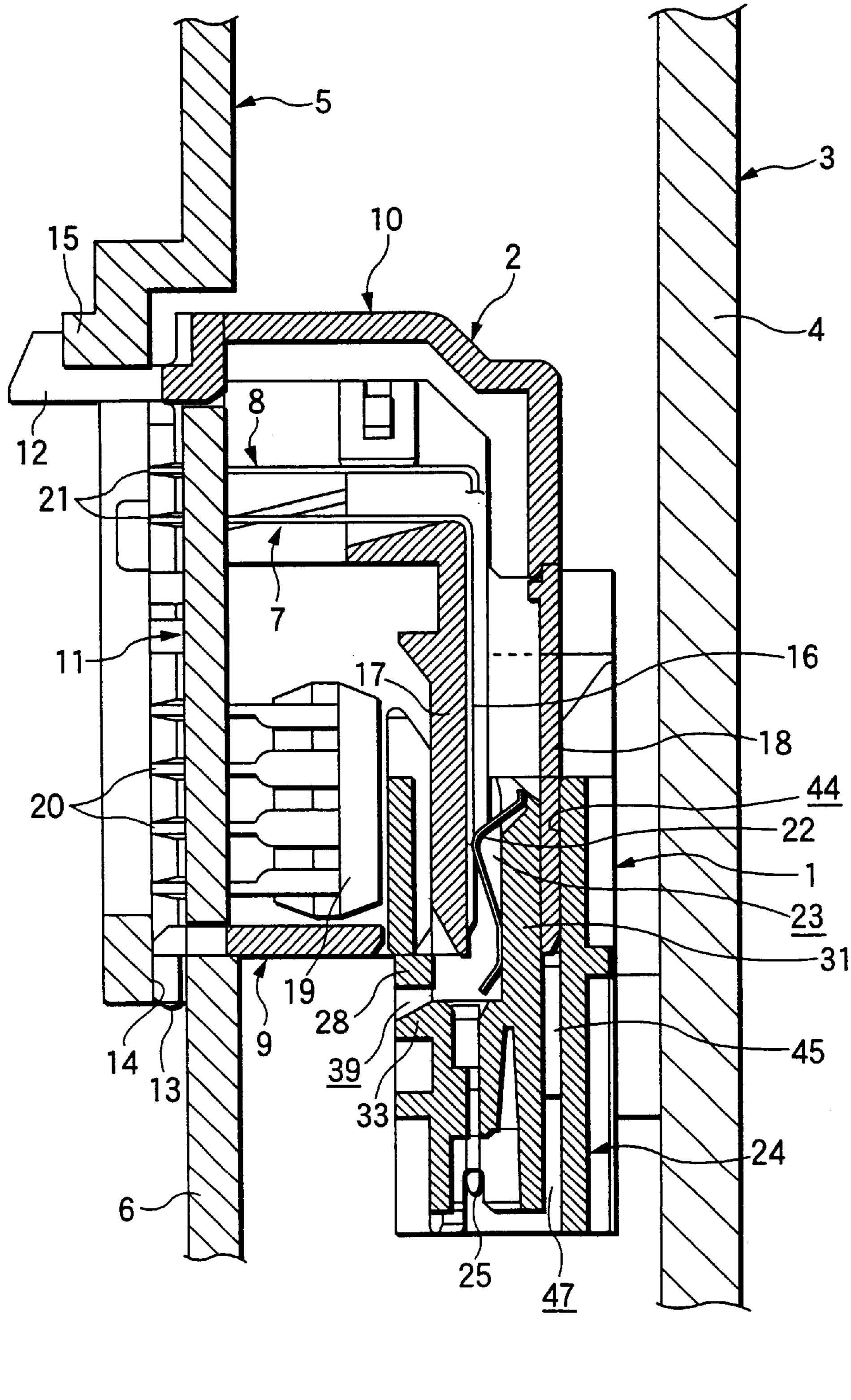
FIG. 5 is a cross-sectional view of the receptacle type connector and the plug type connector which are combined with each other in an image forming device body.

FIG. 1 is an exploded perspective view of a receptacle type connector 1 of an embodiment of the present invention and a plug type connector 2 which forms a pair together with the receptacle type connector 1, FIG. 2 is an exploded perspective view of the receptacle type connector 1 which is viewed from the back face side, FIG. 3 is a longitudinal cross-sectional view of the receptacle type connector, FIG. 4 is a lateral cross-sectional view of the receptacle type connector, and FIG. 5 is a cross-sectional view of both the connectors which are connected with each other.

As shown in FIG. 5, the receptacle type connector 1 is fixed to the side plate 4 of the image forming device body 3. On the other hand, the plug type connector 2 is fixed to the side plate 6 of the toner cartridge 5 which is a maintenance part. When the toner cartridge 5 is attached to and detached from the image forming device body 3, both the connectors 1, 2 are connected with and disconnected from each other.

Referring to FIGS. 1 and 5, the plug type connector 2 includes: a plug housing 9 for holding a plurality of angle-shaped contacts 7, 8 which are aligned in line; a cover housing 10 combined with this plug housing 9; and a circuit board 11 held by both the housings 9, 10.

Reference numeral 12 is a pair of attaching hooks which are protruded onto the upper portion on the back face of the cover housing 10. In FIGS. 1 and 5, only one of the pair of attaching hooks is shown. Reference numeral 13 is a pair of engaging sections which are protruding to the lower portion of the cover housing 10. When the plug type connector 2 is attached to the side plate 6 of the toner cartridge 5, each engaging section 13 is inserted into the corresponding engaging recess 14 of the side plate 6, and then each attaching hook 12 is engaged with the corresponding hook section 15 of the side plate 6.

The plug type connector 2 includes: a contact holding wall 17 for holding the contacting sections 16 of the contacts 7, 8 laterally in line; and a guide wall 18, the cross-section of which is a groove-shape, for covering the contact holding face in parallel with the contact holding wall 17. The contact holding wall 17 and the guide wall 18 are composed of a portion of the plug housing 9.

The circuit board 11 is attached to the back face of the plug housing 9. For example, IC chip 19 is attached to the rear face of the circuit board 11. IC chip 19 and the lead ends 20, 21 of the contacts 7, 8 penetrate the circuit board 11 and are soldered to the circuit on the surface of the circuit board 11.

Referring to FIGS. 1 and 2, the receptacle type connector 1 is open upward so that the contact holding wall 17 of the plug type connector 2 can be inserted and drawn out. The receptacle type connector 1 includes: a housing 24 having a primary inserting and drawing recess 23 for holding the contacts 22 laterally in line; and a plug 27 to be engaged with the recess so that the end portions of all lead wires 26 can be connected with the end portions of the lead sections 25 of the contacts 22 protruding into the recess 60 formed on the lower face of the housing 24.

Referring to FIGS. 2, 3 and 4, the housing 24 includes: a front outer wall section 28; a rear outer wall section 29 opposed to the side plate 4 of the image forming device body 3; right and left side wall sections 30; and an intermediate wall section 31, which is a contact holding wall parallel with both the outer wall sections 28, 29, interposed between the front outer wall section 28 and the rear outer wall section 29. The intermediate wall section 31 composes the first wall section, and the front outer wall section 28 composes the second wall section.

Both side edges of the intermediate wall section 31 and both side edges of the front outer wall section 28 are connected with each other via the longitudinal ribs 32 provided in the corresponding side wall section 30. The periphery of the primary inserting and drawing recess 23 is divided by the front outer wall section 28, the intermediate wall section 31 and a pair of longitudinal ribs 32. The bottom of the primary inserting and drawing recess 23 is composed of an intermediate bottom section 33 provided in the intermediate section of the housing 24 in the height direction.

Referring to FIG. 3, each contact 22 includes: a primary section 35, the profile of which is a groove-shape, fixed to the fixing hole 34 of the intermediate bottom wall section 33; an elastic piece section 36, the profile of which is a wave-form; and a lead section 25 protruding into the recess 60 on the lower face of the housing 24. The elastic piece sections 36 are respectively held by the contact holding grooves 37, which are formed in the intermediate wall section 31 laterally in line, in the primary inserting and drawing recess 23. The top portion of the wave-form of the elastic piece section 36 composes the contact section 38 with respect to the opponent contact 7, 8.

Referring to FIGS. 2 and 3, in the connecting portion of the front outer wall section 28 with the intermediate bottom wall section 33, there is provided a through-hole 39 for discharging toner which penetrates the front outer wall section 28 and is open to the outside. As shown in FIG. 3, the inner bottom face 40 of the through-hole 39 is inclined as it comes outside, so that toner can be easily discharged outside from the primary inserting and drawing recess 23. Referring to FIGS. 2 and 3, reference numeral 41 is a lightening hole. Each side wall section 30 is provided with a pair of upper and lower stays 42, 43.

Referring to FIG. 4, the subsidiary inserting and drawing recess 44, the cross-section of which is a groove-shape, is formed being divided by the intermediate wall section 31, the rear outer wall section 29 and both the side wall sections 30 having the longitudinal ribs 32. This subsidiary inserting and drawing recess 44 is provided so that the guide wall 18 of the plug type connector 2 can be inserted into and drawn out from the subsidiary inserting and drawing recess 44.

The lower portion of this subsidiary inserting and drawing recess 44 for the use of the guide wall 18 is open to the outside via the through-holes 47 penetrating downward between a plurality of ribs 45, 46. The ribs 45 connect the intermediate wall section 31 with the rear outer wall section 29, and the ribs 46 connect the side wall section 30 with the intermediate wall section 31.

FIG. 5 is a view showing a state in which both the connectors 1, 2 are combined with each other. Referring to FIG. 5, the contact holding wall 17 and the guide wall 18 of the plug type connector 2 are engaged in the primary inserting and drawing recess 23 and the subsidiary inserting and drawing recess 44 of the receptacle type connector 1, so that the contacts 7, 8 of the plug type connector 1 and the contacts 22 of the receptacle type connector 2 can be contacted with each other. As shown in FIG. 5, the exits of the through-holes 39, 47 are not arranged at the engaging portion of both the connectors 1, 2.

According to this embodiment, in the case of replacing the toner cartridge 5, even if toner is scattered and intrudes into the primary inserting and drawing recess 23 in the process of replacing the toner cartridge 5, it is possible to easily discharge the toner, which has intruded into the inserting and drawing recess, downward via the through-hole 39 when vibration is given to the receptacle type connector 1 or the side plate 4 in the periphery by lightly tapping it. Accordingly, there is no possibility that the scattered toner impairs the connection of the receptacle type connector with the plug type connector 1 or there is no possibility that the scattered toner impairs the electrical connection between the contacts 7, 8, 22.

Since the through-hole 39 is provided not in the intermediate wall section 31 for holding the contacts 22 but in the front outer wall section 28 opposing to the intermediate wall section 31, this structure is preferable because the toner which has intruded into the primary inserting and drawing recess 23 can be discharged outside without making the toner come into contact with the contacts 22 in the toner conveying process in which the toner is conveyed to the through-hole 39.

Even when toner intrudes into the subsidiary inserting and drawing recess 44 for inserting and drawing the guide wall 18 of the plug type connector 2, the toner can be smoothly discharged downward via the through-hole 47 which is open right below the recess. Accordingly, there is no possibility that the connection of both the connectors 1, 2 is obstructed. When the guide wall 18 and the subsidiary inserting and drawing recess 44 are connected with each other, both the connectors 1, 2 can be strongly connected with a so-called ship-lap or rabbet joint. Therefore, it becomes difficult for toner to intrude into the connectors.

Even in the state of connection of both the connectors 1, 2 shown in FIG. 5, the exits of the through-holes 39, 47 are open. Accordingly, even if the intruding toner remains in the primary inserting and drawing recess 23 and the subsidiary inserting and drawing recess 44 when both the connector 1, 2 are connected, it is possible to facilitate the toner to discharge from the through-holes 39, 47 by the vibration transmitted from a drive system when the image forming device is operated. Therefore, this structure is preferably adopted.

In this connection, the present invention is not limited to the above specific embodiment. For example, the toner cartridge to which the plug type connector, which is an opponent of the receptacle type connector, is attached may be a single body, or alternatively the toner cartridge may be composed of a unit in which the toner cartridge and at least one component (such as a developing device, cleaning device, photoreceptor or charger) composing the image forming device are integrated with each other. Alternatively, the plug type connector may be attached to an electronic part except for the toner cartridge. Further, variations may be made by one skilled in the art without departing the spirit and scope of the present invention.

What is claimed is:

1. A first connector having a receptacle configured to be attached to a second connector having a plug which is configured to be inserted into the first connector when a maintenance part is coupled with an image forming device said first connector comprising:

a housing including an inserting and drawing recess, which is open upward, into which a contact holding wall of the second connector is inserted and from which the contact holding wall of the second connector is drawn out, wherein:

the housing has a through-hole which opens a lower portion of the inserting and drawing recess; and a subsidiary inserting and drawing recess.

2. The first connector according to claim 1, wherein an exit section of the through-hole is not arranged at an engaging portion of the first connector with the second connector forming a pair together with the receptacle type connector.

3. The first connector according to claim 1, wherein four wall sections, to define a periphery of the inserting and drawing recess, include an intermediate wall section for holding contacts coming into contact with contacts of the second connector and a front outer wall section opposing to the intermediate wall section, wherein:

the through-hole is provided in the front outer wall section.

4. The first connector according to claim 3, wherein an exit section of the through-hole is not arranged at an engaging portion of the first connector with the second connector forming a pair together with the receptacle type connector.

5. The first connector according to claim 3, wherein the subsidiary inserting and drawing recess is:

adjacent to the intermediate wall section so as to insert and draw a guide wall of the second connector; and wherein the subsidiary and drawing recess has a through-hole which opens a lower portion of the subsidiary inserting and drawing recess.

6. The first connector according to claim 5, wherein an exit section of the through-hole is not arranged at an engaging portion of the first connector with the second connector forming a pair together with the receptacle type connector.

7. A maintenance part includes a toner cartridge which is insertably attached to an image forming device, said maintenance part having a first connector having a receptacle configured to be attached to a second connector having a plug which is configured to be inserted into the first connector when a maintenance part is coupled with an image forming device said first connector comprising:

a housing including an inserting and drawing recess, which is normally open upward, into which a contact holding wall of the second connector is inserted and from which the contact holding wall of the plug type connector is drawn out, wherein:

the housing has a through-hole which opens a lower portion of the inserting and drawing recess, and a subsidiary inserting and drawing recess.

8. The maintenance part according to claim 7, wherein the subsidiary inserting and drawing recess is:

adjacent to the intermediate wall section so as to insert and draw a guide wall of the second connector; and wherein the subsidiary inserting and drawing recess has a through-hole which opens a lower portion of the subsidiary inserting and drawing recess.

* * * * *